United States Patent [19]

Liu et al.

[11] Patent Number: 4,559,085
[45] Date of Patent: Dec. 17, 1985

[54] METHOD FOR REMOVING SPATTERS FROM A PIPELINE

[76] Inventors: Eddy Y. L. Liu, 83-4, Lin 13, Pin Yuan Li, Iong Hsiao Cheng Miaoli Hsien; Pan F. Rong, 222, Hai-Pin Rd., Wu-Lu Li, Ching-Shui Cheng Taichung, both of Taiwan

[21] Appl. No.: 621,510

[22] Filed: Jun. 18, 1984

[51] Int. Cl.⁴ .......................... B08B 9/00; B08B 9/06
[52] U.S. Cl. .................................. 134/22.11; 73/756; 138/92; 228/125
[58] Field of Search ............... 134/8, 22.11; 138/89, 138/92, 104; 228/125, 201, 184; 220/202, 212, 288; 73/756

[56] References Cited

U.S. PATENT DOCUMENTS

| | | | |
|---|---|---|---|
| 1,509,485 | 9/1924 | Primrose | 134/8 |
| 1,630,269 | 5/1927 | Lippert | 220/288 |
| 3,550,637 | 12/1970 | Briden | 138/92 |
| 3,963,514 | 6/1976 | Wassen | 134/8 |
| 4,005,847 | 2/1977 | Ekman | 73/756 |
| 4,335,757 | 6/1982 | Lankston | 138/92 |

Primary Examiner—Richard V. Fisher
Assistant Examiner—Sharon T. Cohen
Attorney, Agent, or Firm—Ladas & Parry

[57] ABSTRACT

A method for installing a pipeline having a plurality of pipes, including each pipe having at least one handhole in the wall near at least one of its ends, and a threaded cap for closing the handhole, whereby, when a pipe is joined to another pipe by welding, spatters formed at or near the welded joint can be removed by hand through the handhole.

2 Claims, 3 Drawing Figures

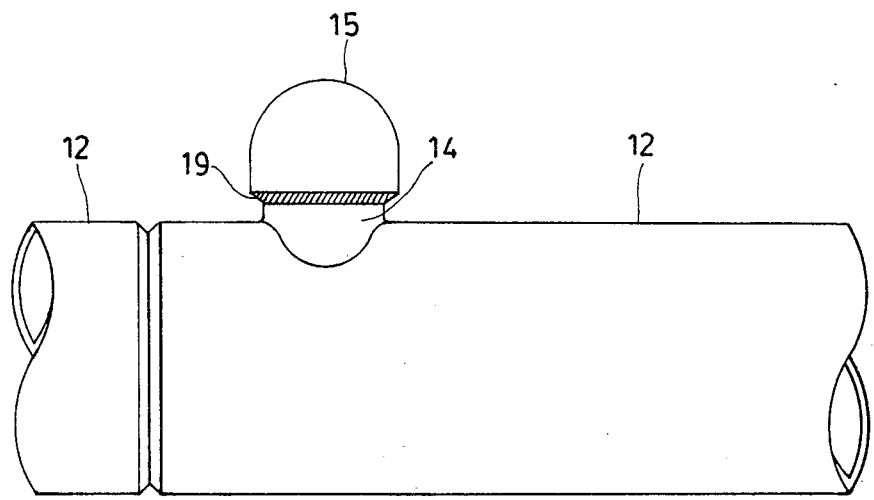
FIG. 1
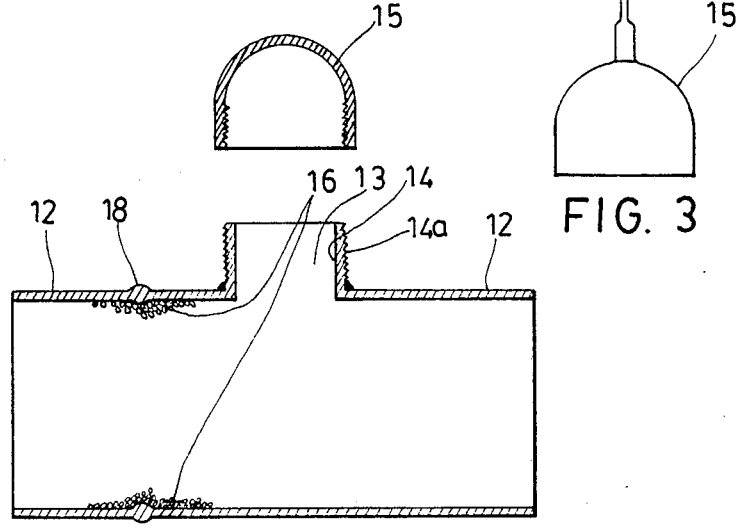
FIG. 2
FIG. 3

METHOD FOR REMOVING SPATTERS FROM A PIPELINE

BACKGROUND OF THE INVENTION

This invention related to a method for cleaning pipelines, particularly to a method for removing spatters from a pipeline.

In a process piping such as, the piping of a power generating plant or a chemical plant, pieces of pipe having large diameters are commonly jointed together by welding. The welding process usually result in the formation of spatters at the welded joint which pollutes the pipeline and, in some cases, seriously harms the processing device. It is known that, after installation, piping must be subject to a pressure test for testing the quality of the welded joint prior to initial operation. After the pressure test, operations, such as, flashing, boiling out and blowing off, must be done frequently, until it is assured that residual spatters in the pipeline are completely removed. The blowing off operation has resulted in an increase in the investment cost as well as an increase in labor.

SUMMARY OF THE INVENTION

An object of the invention is to provide a method for easily removing spatters formed in the pipeline during the welding of pipe.

The foregoing and other objects can be achieved in accordance with the invention through the provision of a method for removing spatters formed in the pipeline which comprises: initially providing one or two handholes in the pipe wall near one or two ends of a pipe which is to be welded; and removing spatters manually through the handhole after welding.

In one aspect of the invention, the handhole is provided with a projecting neck and a cap to be coupled to the neck for closing the handhole. The provision of the cap will render the positioning of instruments easier.

The presently examplery preferred embodiment will be described in detail with reference to the accompanying drawings.

BRIEF DESCRIPTION OF THE DRAWINGS

FIG. 1 is a schematic view showing a portion of a pipeline in which two pieces of pipe are welded together and a handhole is provided near one of its joint end;

FIG. 2 is a schematic sectioned view showing how the spatters formed in the pipeline can be removed through the handhole; and FIG. 3 is a schematic view showing how an instrument can be mounted on the cap.

DETAILED DESCRIPTION OF THE PREFERRED EMBODIMENT

Referring to the drawings, there is shown a portion of a pipeline in which each piece of pipe 12 is joined to the others by welding. Each piece of pipe 12 is provided with a handhole 13 in its wall near its one end and a projecting neck 14 which is welded to the inner side and the outer sides of the wall of the pipe 12 at the handhole 13. Before welding, the pipe 12 must be preheated, and, after welding, the welded components must be subject to the stress relief treatment and the inspection by X-ray or the like to inspect the quality of the welding. The neck 14 is provided with a screw thread formation 14a and a cap 15 having internal screw threads to be coupled to the neck 14, thereby closing the handhole 13.

When pieces of pipe 12 are welded, the projecting neck 14 can be extended upward or downward according to the convenience for operation or the requirements. The end of the pipe which has a handhole 13 is connected to the end of another pipe which has no handhole 13. The cap 13 may or may not be provided with an opening.

After welding the pipes 12, each handhole 13 is opened by removing the cap 15, and spatters 16 which is formed in the pipeline near or at the welded joint are removed manually with abrasives or the like. After assuring that the pipeline is cleaned, the handhole 15 is closed with the cap 15 which is then welded to the neck 14 at the threaded joint 19.

When the handhole 13 and the cap 15 are extended upward at the handhole 13, and the cap 15 is provided with an opening, it can be used for the instrument installation, such as, for installating pressure gauge, pressure transmitter, temperature gauge, temperature transmitter, vant valve, or sampling tubes. The instrument can be welded to the cap 15 which has an opening prior to the connecting of the cap 15 to the neck 14, thereby eliminating further pollution of the pipe resulting from the welding of the instrument to the pipe 12. The cap 15 or the neck 14 can also be used as a point for attachment of the hanging device for the pipeline, thereby eliminating the requirement of further fittings for the same purpose and saving time and labor.

The handhole 13 is located at the bottom side of the pipe 12 only when it is intended to be used as a drain pot or for positioning steam trap or drain valve, etc. In any other case, the handhole 13 is located at the upper side of the pipe 12. since the handhole 13 and the cap 15 may act as a trap for the accumulation of condensate of liquid. When the pipeline is used for transporting high pressure and high temperature steam or liquid, this trap may result in the occurance of a water hammer.

In the case that a flow meter or a valve is intended to be installed in the pipeline, a piece of pipe 12 having two handholes 13 and two caps 15 must be used so that there will be two handhole 13 at the two sides of the welded joint of two pipes 12. The flow meter or the valve can be located and welded at the joint between two pipes 12, and the spatter formed can be removed from the handholes 13 which are at two sides of the flow meter or the valve. Besides, these two caps 15 which have openings can be used as pressure sensing points for determining differential pressure at two sides of the orifice of the flow meter.

If the spatters in the pipeline are removed according to the method described above, the blowing off operation need not be performed as many times as done in the past, after the pressure test, to achieve the same effect, thereby saving the time, energy and expanses for performing this operation. In addition, the presence of the neck 14 and the cap 15 facilitates the installation of a piping and instruments and thus saves time and expenses for such installation.

With the invention thus explained, it is apparent that obvious modification and variations can be made without departing from the scope of the invention. It is therefore intended that the invention be limited only as indicated in the appended claims.

We claim:

1. The process of installing a pipeline having a plurality of pipes welded together which includes, (a) utilizing pipes each of which has a handhole in its wall near one of its ends which is to be welded to the other, a projecting neck with external screw threads at each handhole and a cap with internal screw threads for each projecting neck, (b) after welding the pipes, removing through the handholes the spatters created in the pipeline due to the welding, (c) threadedly attaching the caps on the respective handholes after removal of the spatters, and (d) welding the ends of each cap around the periphery of the neck.

2. The process as claimed in claim 1, further including (e) installing an instrument or a valve on the cap.

* * * * *